UNITED STATES PATENT OFFICE.

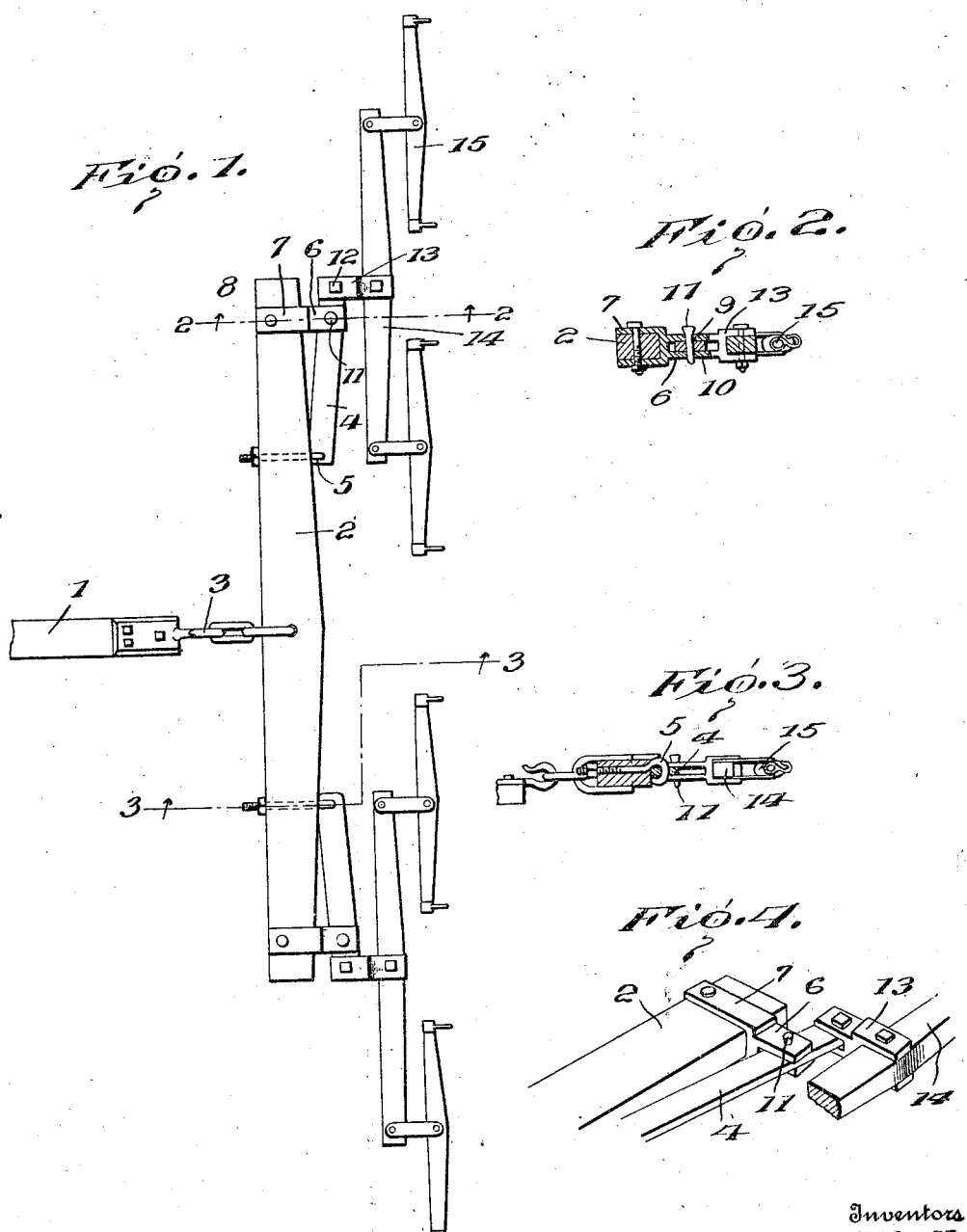

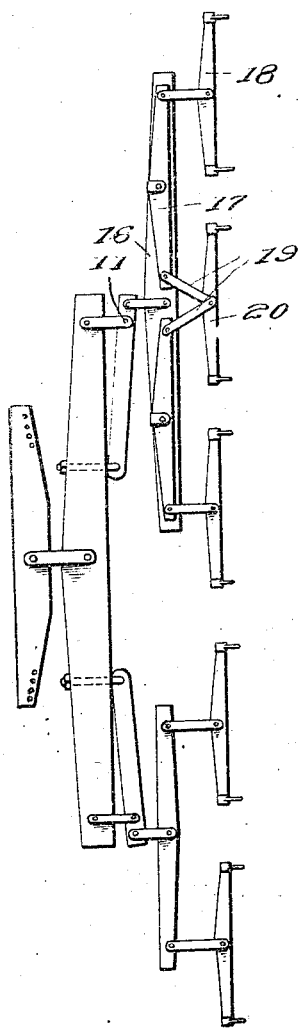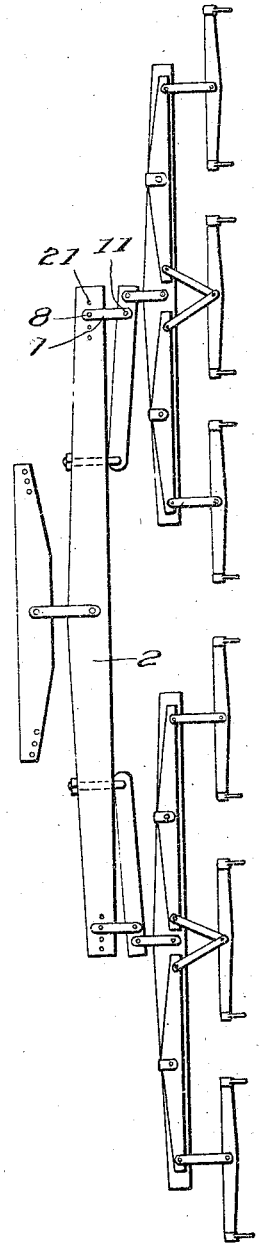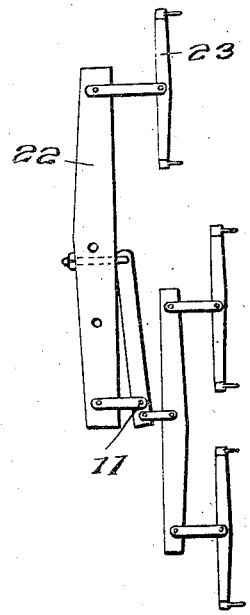

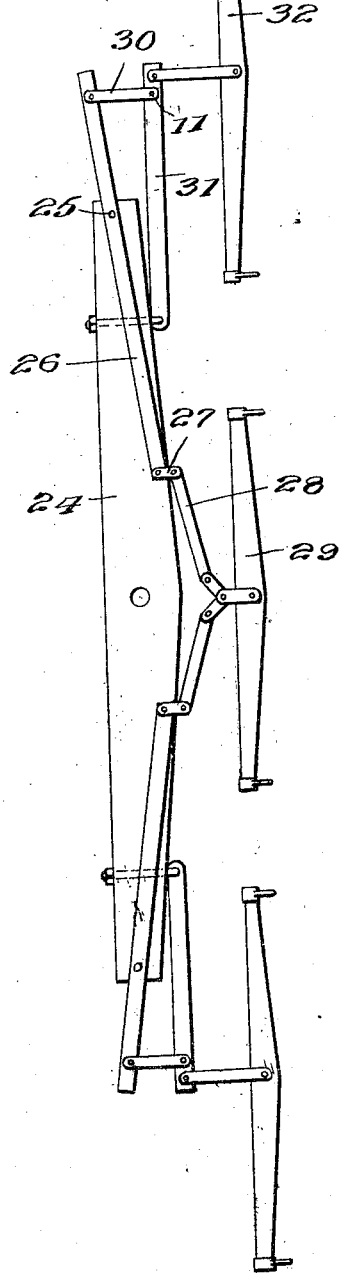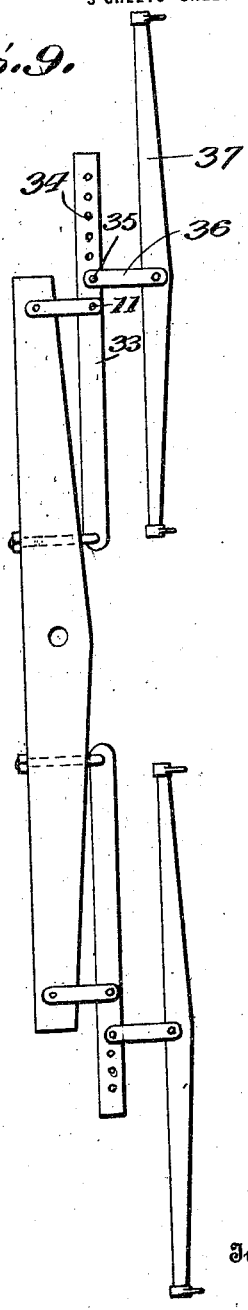

JOHN D. McNEILL, OF CORNING, AND LYMAN R. BROWN, OF LAWRENCE, KANSAS.

DRAFT DEVICE.

1,261,252. Specification of Letters Patent. Patented Apr. 2, 1918.

Application filed August 20, 1915, Serial No. 46,547. Renewed January 10, 1918. Serial No. 211,320.

*To all whom it may concern:*

Be it known that we, JOHN D. McNEILL and LYMAN R. BROWN, citizens of the United States, residing at Corning, county of Nemaha and State of Kansas, and Lawrence, in the county of Douglas and State of Kansas, have invented certain new and useful Improvements in Draft Devices, of which the following is a specification.

This invention relates to draft devices such as are employed in connection with plows, listers, planters and other agricultural implements and to which are desired to be connected two or more draft animals.

In ordinary constructions of draft devices of this class in the event that the plow blade or blades or some other portion of the implement comes in contact with a stump or some other obstruction in the field, the sudden strain imposed upon the harness traces is liable to result in the traces being broken or in breakage of some element of the draft device as result of which the draft animals are liable to become frightened resulting frequently in serious accidents and in any event rendering necessary the expenditure of money for repairs either to the harness or to the draft device to say nothing of the time which is lost while such repairs are being made.

Therefore, it is the primary aim of the present invention to provide a draft device of this class of such construction that no injury to the harness or to any portion of the device itself, having any appreciable value, will be occasioned in the event obstructions are met in the field, and incidentally the draft device embodying the present invention reduces to a minimum the likelihood of accidents which might be occasioned by the draft animals becoming frightened and running away.

The invention also aims to so construct the device that in the event an obstruction is met in the field the draft animals will, after the obstruction has been met with, be permitted to travel forwardly a sufficient distance to enable the driver to properly control them and bring them to a standstill before such strain can be imposed upon the harness or the draft device as would be likely to result in damage.

A further object of the invention is to provide a construction of draft device which will permit of the use of a lighter plow or lister or other implement or machine to accomplish the same results as by the use of a comparatively heavy plow or other implement or machine, thereby permitting of one or more of the draft animals to be dispensed with.

The principles of the present invention may find embodiment in various types of draft devices and, therefore, only a few of these embodiments are illustrated in the accompanying drawings:

In the drawings:

Figure 1 is a plan view of a four horse equalizer illustrating the application of the invention thereto.

Fig. 2 is a vertical sectional view on the line 2—2 of Fig. 1.

Fig. 3 is a similar view on the line 3—3 of Fig. 1.

Fig. 4 is a perspective view of a portion of the draft device.

Fig. 5 is a plan view illustrating the embodiment of the invention in a five horse equalizer.

Fig. 6 is a similar view illustrating the invention embodied in a six horse equalizer.

Fig. 7 is a similar view illustrating a three horse equalizer.

Fig. 8 is a similar view illustrating another form of three horse equalizer.

Fig. 9 is a similar view illustrating the embodiment of the invention in a two horse equalizer.

That portion of the draft device in which the present invention resides is substantially the same in all of the embodiments of the invention illustrated in the drawings, the arrangement of the parts of the draft device as a whole, merely, differing in the several forms illustrated. Referring particularly to Figs. 1 to 4 inclusive, the numeral 1 indicates the beam or tongue of a plow or other agricultural implement and 2 the draft beam of the device which is connected with the said beam or tongue 1 by the usual clevis and link connection indicated at 3.

That portion of the device constituting the present invention includes a draft bar 4 which is pivotally connected at its inner end to an eye bolt 5 which is secured through the draft beam 2, one of these bars being located at each end of said beam and the outer ends of the bars being located substantially opposite the adjacent outer ends of the beam. The bars 4 extend laterally in opposite directions with respect to each other and at a slight angle forwardly from the draft beam 2 and adjacent their outer ends each bar extends between spaced ears 6 of a clip 7 which is bolted or otherwise secured as at 8 to the draft beam 2 near the corresponding outer end thereof. The ears 6 are provided with vertically alined openings 9 and the bar which passes between the ears is provided with an opening 10 designed to register with the openings 9 as shown in Fig. 2 of the drawings. A break pin 11 is fitted through the openings 9 and 10 in the manner shown in said Fig. 2 and this pin is of some suitable wood such for example as oak or hickory. The purpose of this break pin will presently be described. Pivoted as at 12 to the outer end of each bar is a clip 13 which supports a double-tree 14 provided at each end with a swingle-tree 15. While the break pin 11 is of wood, as stated above, it is of sufficient strength to withstand ordinary strain imposed upon the draft device as a whole under ordinary conditions. When, however, an obstruction is met with in the field as for example a stump, and the blade or blades of the implement or some other portion of the implement or machine to which the draft device is connected, comes in contact with the obstruction, the break pin 11 will be fractured or broken owing to the additional and severe strain imposed upon it and the draft bar 4 or both bars in the event that both break pins become fractured, is permitted to swing forwardly upon the eye bolt 5 as a pivot thereby allowing the draft animals connected with that end of the draft device, to move forwardly without further strain being imposed upon them and upon the harness as well as upon the draft device itself. When this occurs sufficient time is given the driver to control the draft animals and bring them to a standstill before the harness and other portions of the device are again subjected to strain. Thus injury to the harness or to the draft device itself is effectually prevented and, furthermore, inasmuch as the draft bar 4 serves to support the double-tree or other draft element 14 which is connected to it, the said draft element is prevented from falling against the rear legs of the draft animals as would ordinarily be the case and the consequence of a runaway are avoided.

Parts illustrated in Fig. 5 corresponding to parts shown in Figs. 1 to 4 inclusive are indicated by corresponding reference numerals and the arrangement of parts is substantially the same except that the double-three 14 is replaced at one side of the draft device by a draft beam 16 having swiveled thereon trees 17 to the remote ends of which are connected swingle-trees 18 and to the adjacent ends of which are connected links 19 pivotally connected at their forward ends to a swingle-tree 20 located between the trees 18. As before stated, this figure illustrates the embodiment of the invention in a five horse equalizer.

In Fig. 6, in which the invention is illustrated as embodied in a six horse equalizer, the arrangement is substantially the same as shown in Fig. 5 except that the parts 16 to 20 inclusive are duplicated at the other end of the draft beam 2. In this particular embodiment it may be found desirable to provide a series of openings 21 in the draft beam 2 at each end thereof to which the bolt 8 for securing clip 7 in place may be selectively fitted.

In Fig. 7 of the drawings the draft beam is indicated by the numeral 22 and has connected to it at one end a swingle-tree 23, the arrangement at the other end of the beam being substantially the same as that at either end of the beam 2 shown in Fig. 1 of the drawings.

In Fig. 8 of the drawings the numeral 24 indicates a draft beam corresponding to the beam 2 and swiveled as at 25 at each end of this beam is a draft bar 26 to the adjacent ends of which bars are connected by means of links 27, the ends of draft links 28 supporting a swingle-tree 29. To the outer end of each draft bar 26 there is connected a link 30 and this link is connected at its forward ends by means of one of the break pins 11, to a draft bar 31, corresponding to the draft bar 4 in the previously described forms of the invention. To the outer end of each draft bar 31 there is connected a swingle-tree 32.

The arrangement shown in Fig. 9 of the drawings is substantially the same as that illustrated in Fig. 1 except that the draft bar corresponding to the bar 4 and indicated by the numeral 33 is formed with a series of openings 34 through which may be interchangeably fitted a pivot bolt 35 at the rear end of the link 36, a swingle-tree 37 being connected at the forward end of the said link.

It will be understood further from the foregoing description that by employing the break pin embodying the present invention, likelihood of injury to or breakage of the plow or lister share or point when an obstruction is met with, is reduced to a minimum. Furthermore, by the use of the present invention, it is possible to make use of a lighter plow or lister or other implement or machine and to eliminate one or more of the draft animals.

It will be understood, of course, that the device embodying the present invention may be employed upon plows and listers drawn by steam or other motor power as well as implements drawn by draft animals.

Having thus described the invention, what is claimed as new is:

In a draft device of the class described, a draft beam, a draft bar pivotally connected at one end to the forward side of the beam and extending in the direction of the end of the beam, a member secured to the beam and provided with spaced forwardly projecting ears formed with vertically alined openings, the draft bar extending between the said ears and being provided with an opening registering with the first-mentioned openings, a frangible pin fitted in the openings, and a draft element connected to the said draft bar.

In testimony whereof we affix our signatures.

JOHN D. McNEILL. [L. S.]
LYMAN R. BROWN. [L. S.]